(12) United States Patent
Ferreira Alves et al.

(10) Patent No.: US 7,117,491 B2
(45) Date of Patent: Oct. 3, 2006

(54) METHOD, SYSTEM, AND PROGRAM FOR DETERMINING WHETHER DATA HAS BEEN MODIFIED

(75) Inventors: Luis Antonio Ferreira Alves, San Jose, CA (US); Yip-Hing Ng, San Jose, CA (US); Michael Harris Rosett, San Jose, CA (US); Jyh-shiarn Yur, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 10/232,012

(22) Filed: Aug. 29, 2002

(65) Prior Publication Data

US 2004/0044702 A1 Mar. 4, 2004

(51) Int. Cl.
*G06F 9/44* (2006.01)

(52) U.S. Cl. .................. 717/168; 717/110; 717/120; 717/162

(58) Field of Classification Search ........ 709/213–223; 707/1–204; 717/110–168
See application file for complete search history.

(56) References Cited

U.S. PATENT DOCUMENTS

| | | | | |
|---|---|---|---|---|
| 5,987,506 A | * | 11/1999 | Carter et al. | 709/213 |
| 6,411,966 B1 | * | 6/2002 | Kwan et al. | 707/201 |
| 6,662,198 B1 | * | 12/2003 | Satyanarayanan et al. | 707/204 |
| 2002/0083166 A1 | * | 6/2002 | Dugan et al. | 709/223 |
| 2002/0194206 A1 | * | 12/2002 | Ganesh et al. | 707/200 |
| 2005/0021713 A1 | * | 1/2005 | Dugan et al. | 709/223 |
| 2005/0065907 A1 | * | 3/2005 | Chandrasekaran et al. | 707/1 |

* cited by examiner

*Primary Examiner*—Kakali Chaki
*Assistant Examiner*—Mark P. Francis
(74) *Attorney, Agent, or Firm*—David W. Victor; Konrad Raynes & Victor LLP

(57) ABSTRACT

Provided are a method, system, and program for determining whether data has been modified. One node associated with at least one data unit and a last version number is received. A data structure having a plurality of nodes is processed, wherein there is one node associated with each data unit and at least one node that is capable of aggregating one or more nodes, and wherein version numbers are associated with the nodes. A determination is made from the data structure of one node that is associated with the data units associated with the received node. A determination is then made that at least one data unit associated with the received node has been modified if the received last version number is less than a version number of the determined node.

28 Claims, 7 Drawing Sheets

METHOD, SYSTEM, AND PROGRAM FOR DETERMINING WHETHER DATA HAS BEEN MODIFIED

BACKGROUND OF THE INVENTION

1. Field of the Invention

The present invention relates to a method, system, and program determining whether data has been modified.

2. Description of the Related Art

In a network environment, client systems may maintain a local version of data from a database at a server, where each client may maintain a different subset of the data at the server database. Periodically, the clients may request synchronization of the subset of data at the client local database and corresponding data at the server database. As part of such synchronization, the server may provide a copy of the entire subset of data the client maintains from the server database. This copy may include data that has changed and not changed since the last synchronization. This prior art technique needlessly consumes network resources to transmit data that has not changed and that the client does not need to synchronize.

Another prior art technique is for the server system to scan the entire server database to find any of the subsets of data being synchronized that have changed since the last synchronization, and then send to the client only the data that has changed. This prior art technique requires that the server scan the entire database for data corresponding to the client subset of data that has changed even if some or all of the client subset of data has not changed. This process of scanning the database can consume significant server and database resources if multiple clients are requesting synchronization concurrently. For each requesting client, the server would have to open a connection with the database and scan the entire database for changes to the subset of data being synchronized.

For these reasons, there is a need in the art for improved techniques for detecting changes in data.

SUMMARY OF THE DESCRIBED IMPLEMENTATIONS

Provided are a method, system, and program for determining whether data has been modified. One node associated with at least one data unit and a last version number is received. A data structure having a plurality of nodes is processed, wherein there is one node associated with each data unit and at least one node that is capable of aggregating one or more nodes, and wherein version numbers are associated with the nodes. A determination is made from the data structure of one node that is associated with the data units associated with the received node. A determination is then made that at least one data unit associated with the received node has been modified if the received last version number is less than a version number of the determined node.

In further implementations, a determination is made as to whether the received last version number is less than a first node version number in the data structure before determining one node that is associated with the data units associated with the received node. A determination is made that the received node has not been modified if the received last version number is not less than the first node version number.

Further, determining one node that is associated with the data units associated with the received node may comprise determining the node in the processed data structure that matches the received node.

Still further, the data structure may indicate a relationship of nodes, wherein one node is directly associated with each data unit, and wherein further aggregate nodes aggregate any one or more nodes in the data structure.

Yet further, the nodes may be arranged in the data structure in a tree data structure, wherein each aggregate node is the parent to at least one other aggregate node or one node that is directly associated with one data unit.

Described implementations provide techniques for determining modifications to data units in a matter that determines the minimal set of changed data.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
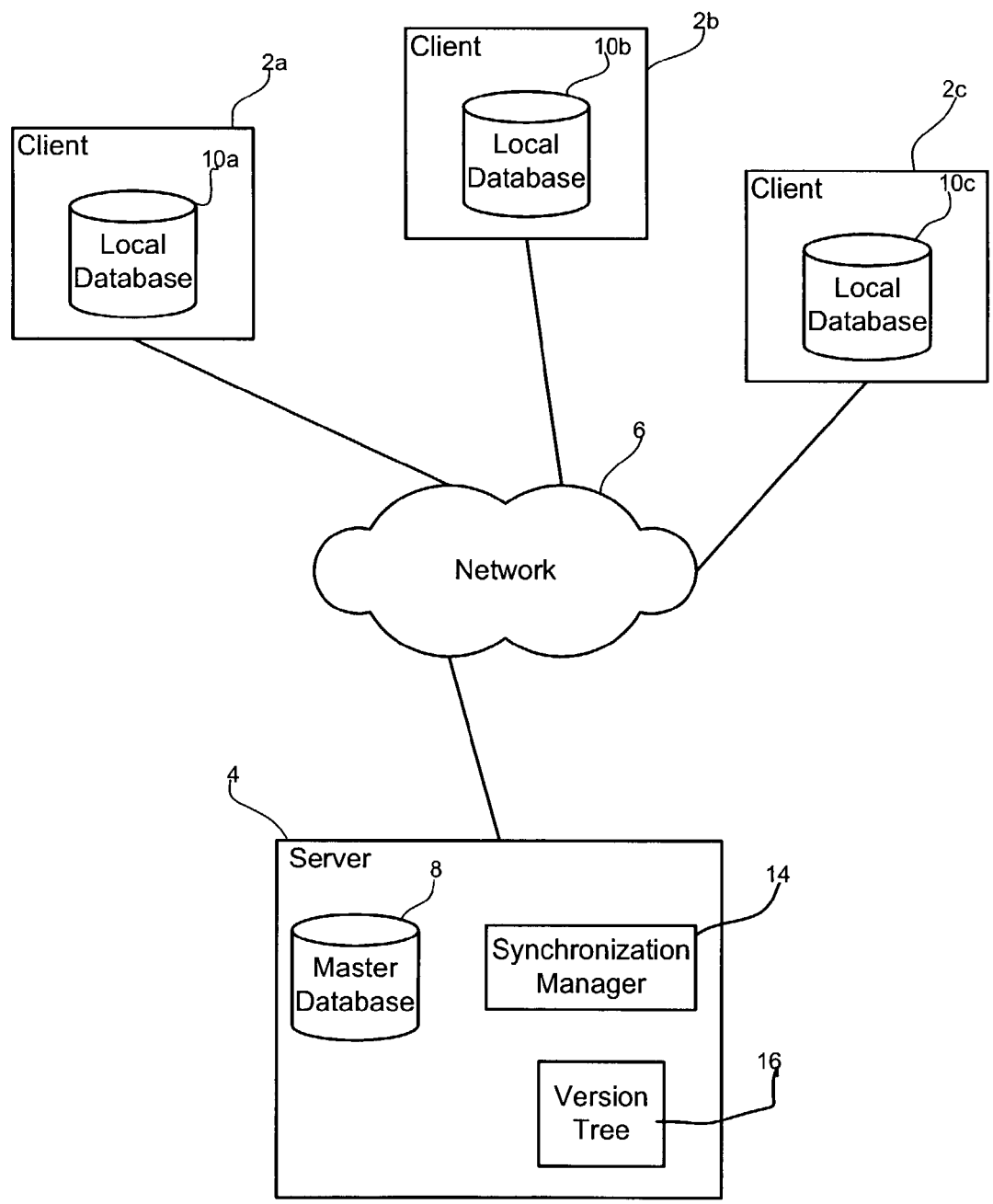
FIG. 1 illustrates a network computing environment in which aspects of the invention are implemented.

FIG. 1 illustrates a network computing environment in which aspects of the invention may be implemented. A plurality of clients systems 2a, 2b . . . 2n connect to a server 4 over a network 6. The server 4 includes a master database 8 and each client includes a local database 10a, 10b . . . 10n, which comprises a subset of the data at the master database 8. The client subset may include one or more tables from the master database 8 or a subset of records that satisfies a certain criteria.

The client systems 2a, 2b . . . 2n may comprise any computing device known in the art, such as as a personal computer, laptop computer, workstation, mainframe, telephony device, handheld computer, server, network appliance, etc. The server 4 may comprise a server class machine or any computing device known in the art capable of handling requests from multiple clients. The local 10a, 10b . . . 10n and master 8 databases may comprise a relational database, object oriented database, or any other grouping of data known in the art, where the master database 8 contains all the elements in the local databases 10a, 10b . . . 10n, and each local database 10a, 10b . . . 10n may comprise a subset of the master database 8. The network 6 may comprise any network known in the art, such as Intranet, the Internet, a Local Area Network (LAN), Wide Area Network (WAN), Storage Area Network (SAN), etc.

The server 4 further includes a synchronization manager 14 that performs synchronization related operations to ensure that the local databases 10a, 10b . . . 10n include a most recent version of the master database 8 in response to client synchronization requests. The synchronization manager 14 utilizes a version tree 16 data structure that provides version information on each data unit component that may be separately maintained in the local databases 10a, 10b . . . 10n.

Figure 2:
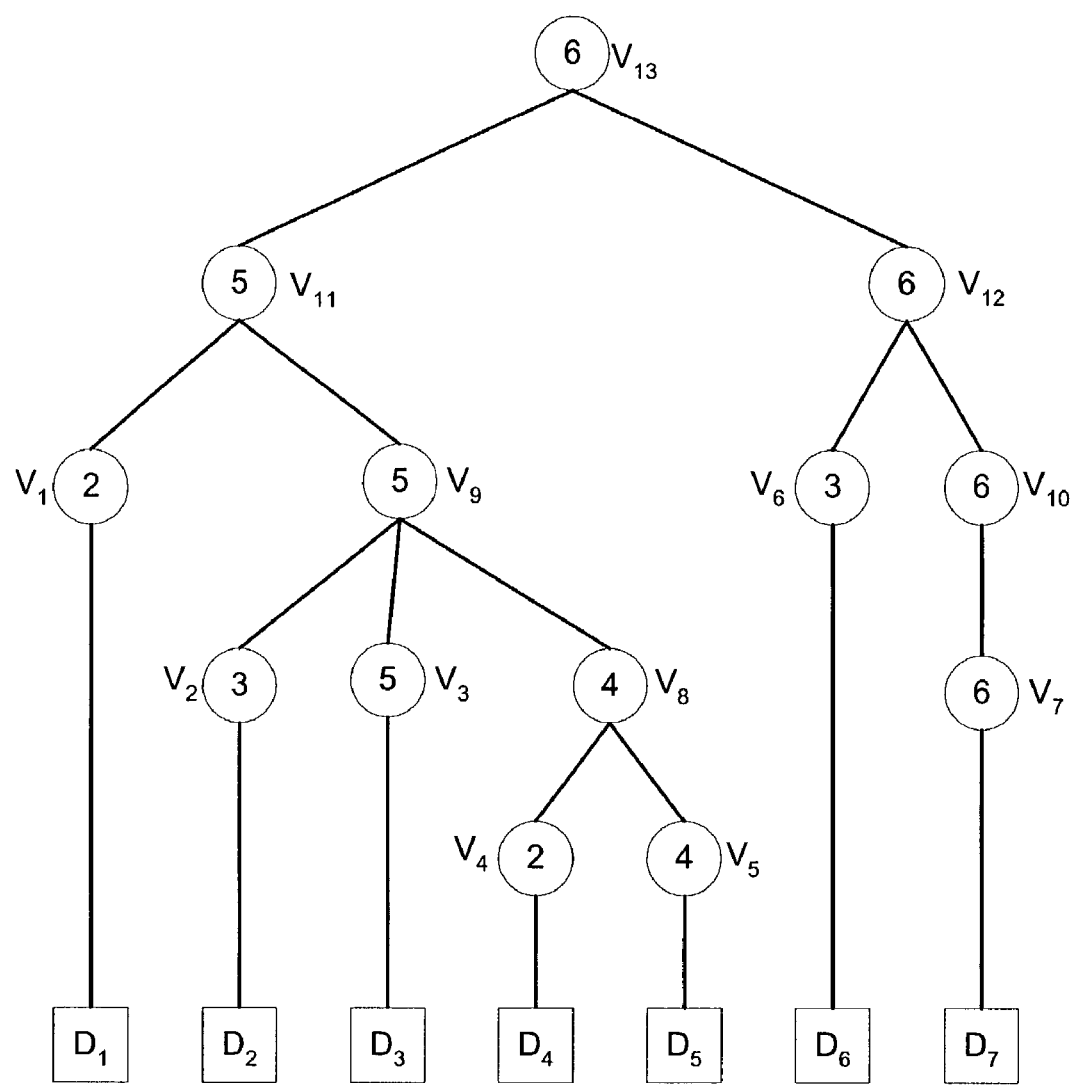
FIGS. 2 and 4 illustrate examples of a tree data structure to maintain information on changes to data units in accordance with implementations of the invention.

FIG. 2 illustrates an example of a version tree 16 having leaf nodes representing data units ($D_i$) where a data unit comprises any data element to which a client 2a, 2b . . . 2n may separately subscribe, such as tables in the master database 8, records within tables, sets of records, etc. Alternatively, in implementations where the master data maintained by the server 4 comprises a type of data other than a database, such as a file system or any other data structure aggregating separate data components, then the data units may comprise a separate component of such master data, where such component data may comprise any type of data structure known in the art.

In the version tree 16, such as shown in FIG. 2, each intermediary node ($V_i$) contains a version number or timestamp for that node. The numbers within the circles representing the intermediary nodes ($V_i$) comprise the version numbers for that node. The first level nodes $V_1, V_2 \ldots V_7$ directly connected to data units $D_1, D_2 \ldots D_7$, respectively, include version number information for the data units. Further, each intermediary node at a level above the first level includes the highest version number of any intermediary node that is a descendent of the intermediary node. The version number may comprise any value which may be incremented.

In certain implementations, a systems administrator or other user may group the first level nodes $V_1, V_2 \ldots V_7$ representing the data units ($D_i$) under a common intermediary non-leaf node ($V_1$). Intermediary nodes ($V_i$) may also aggregate lower level intermediary nodes that are related. For instance, in certain implementations, the nodes ($V_1$) may group data units ($D_1$) and lower level nodes ($V_i$) to which a client 2a, 2b . . . 2n may separately subscribe. In a further example, one data unit, e.g., $D_4$, may comprise a table of customer names, and another data unit, e.g., $D_5$, may contain customer addresses for the customer names. Because these name and address data units $D_4$ and $D_5$ are related, an intermediary node $V_8$ may group these two tables together so that they may be synchronized together. Further, if the data units represent directories in a file system, then the nodes may represent groups of directories for which different clients have access. Thus, any of the nodes above the first level of nodes $V_1, V_2 \ldots V_7$ may group the lower level nodes according to any type of relationship.

The nodes of the version tree 16 may be implemented using any programmable tree data structure known in the art that provides interconnection and traversability among the nodes.

Figure 3:
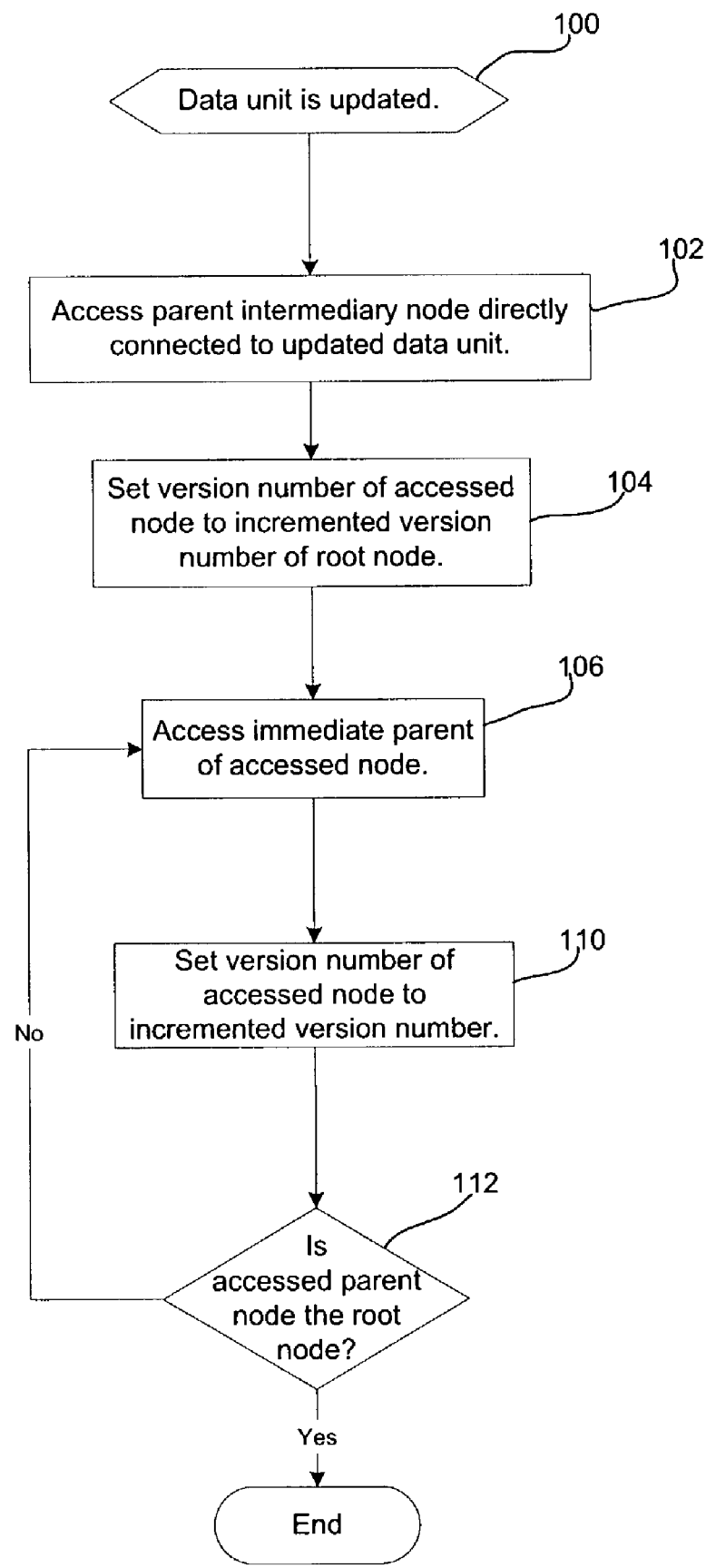
FIG. 3 illustrates logic to update the version numbers in the tree data structure in accordance with implementations of the invention.

FIG. 3 illustrates logic implemented in the synchronization manager 14 at the server 4 to update the version tree 16 when data units ($D_i$) represented as leaf nodes in the tree are modified. Initially, all the version numbers at each intermediary node ($V_i$) will be set to the same initial value. Control begins at block 100 upon detecting that data at one data unit ($D_1$) has been updated. In response, the synchronization manager 14 accesses (at block 102) the node ($V_1$) directly connected to the leaf node representing the updated data unit ($D_1$) and sets (at block 104) the version number the accessed node ($V_1$) to the version number of the root node incremented by one. To propagate the updated version number to all ancestor intermediary nodes ($V_i$) of the leaf node, the synchronization manager 14 accesses (at block 106) the immediate parent node of the accessed node and sets (at block 110) the version number for the accessed parent node ($V_i$) to the new version number for the updated data unit. If (at block 112) the accessed node is the root node, then control ends. Otherwise, control proceeds back to block 106 to access the parent node of the current accessed node and set to the incremented version number.

With the logic of FIG. 3, an incremental version number for a modified data unit propagates to all ancestor nodes of the leaf node corresponding to the modified data unit. A descendant node is any node that is a child or child more than once removed from the subject node, and an ancestor node is any node that is a parent or parent more than once removed from the subject node. Further, the leaf nodes comprise the V nodes directly connected to the data units, which includes nodes $V_1, V_2 \ldots V_7$ shown in FIG. 2.

Figure 4:
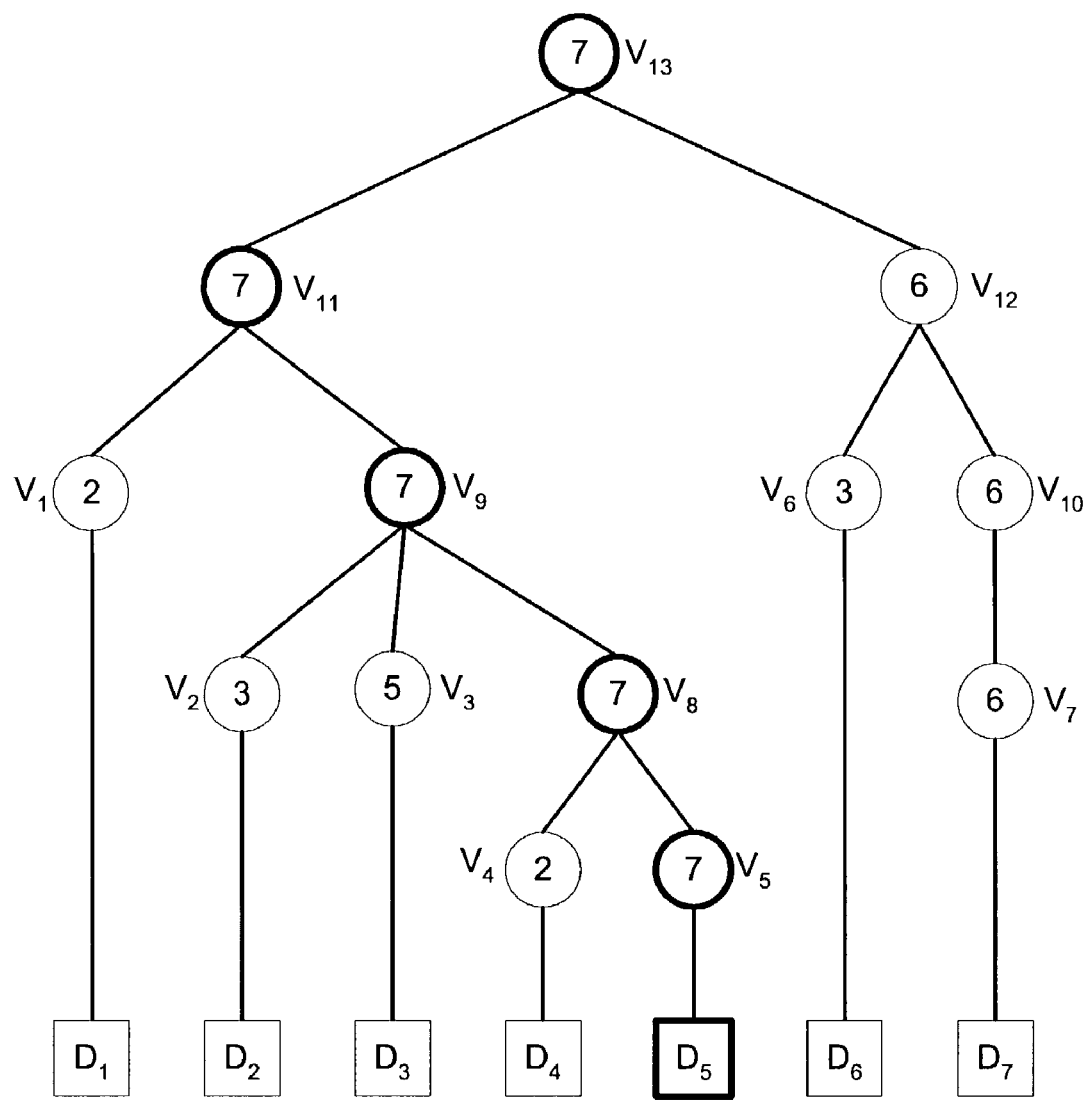

FIG. 4 illustrates how incrementing the version number for the data unit $D_5$ to a value of seven is propagated to ancestor nodes that have version numbers less than the version number of seven. In the example of FIG. 4, the incremented version number for data unit $D_5$ is propagated to all ancestor nodes of data unit $D_5$.

Figure 5:
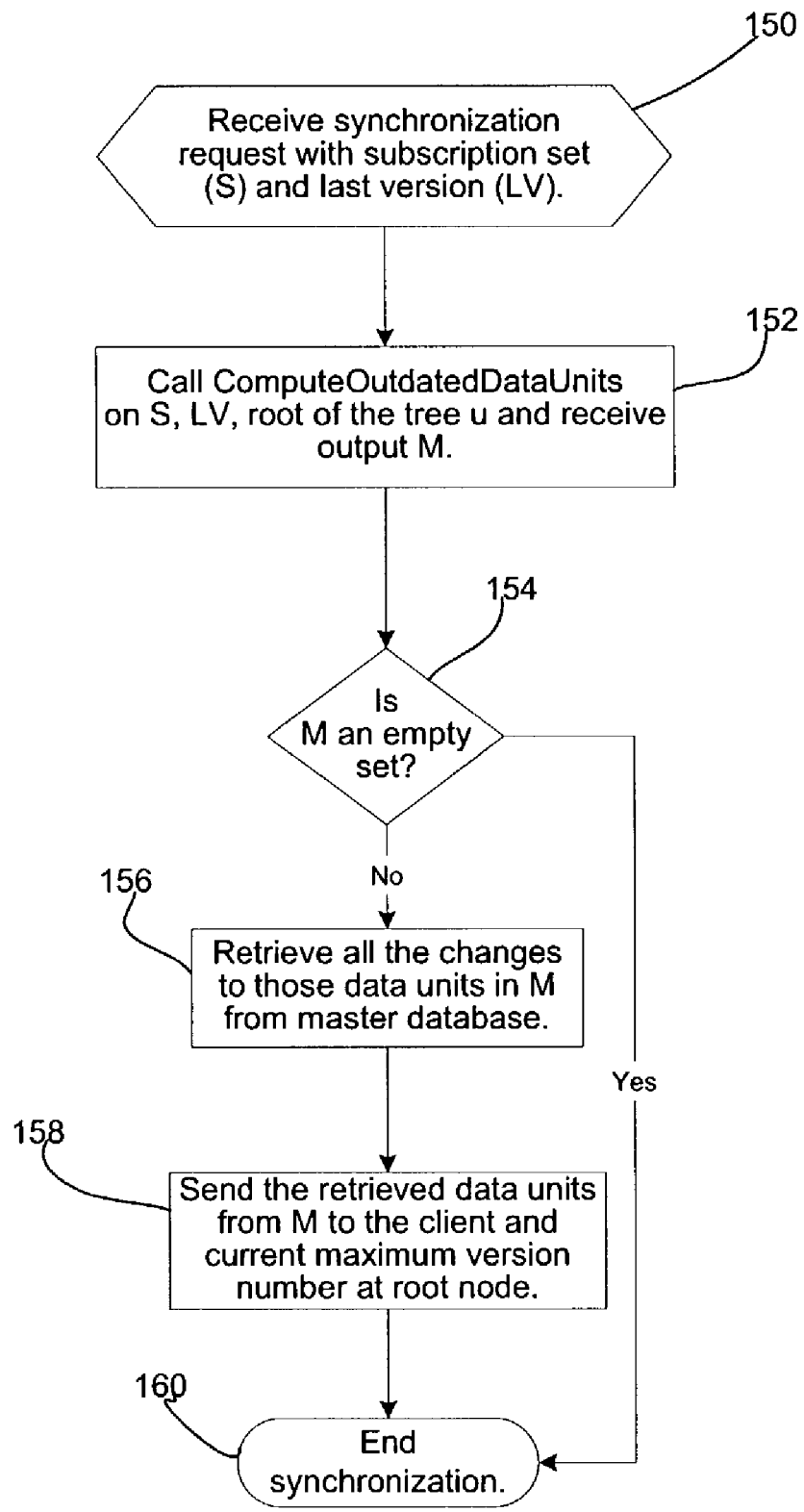
FIGS. 5 and 6 illustrates logic to process a synchronization request to determine changes to data in accordance with implementations of the invention.
Figure 6:
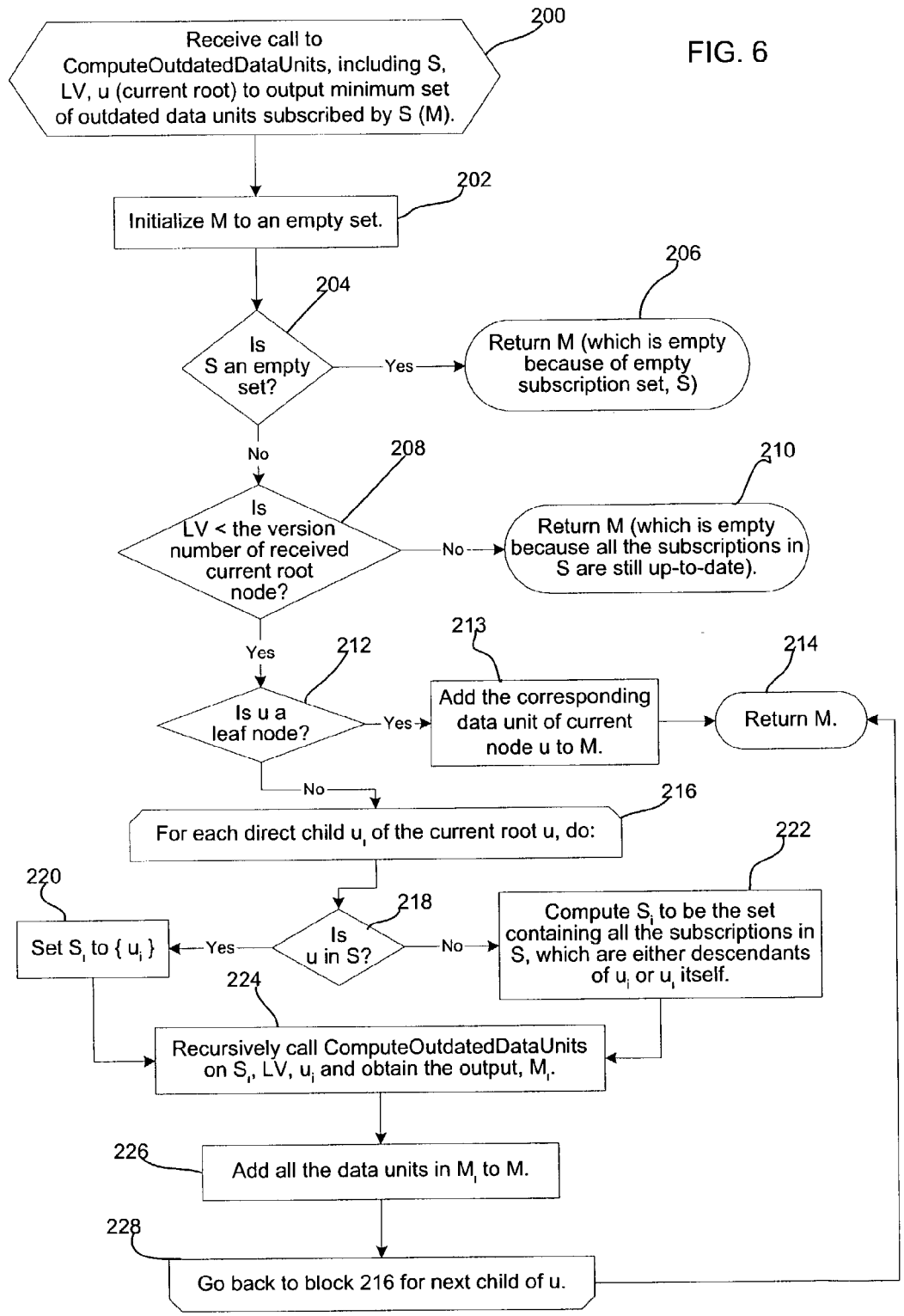

FIGS. 5 and 6 illustrate logic implemented in the synchronization manager 14 to determine data units that have changed in response to a client synchronization request. When submitting a synchronization request, each client 2a, 2b . . . 2n would submit a subscription set (S) for that client, where a subscription set is an aggregate of one or several data units and is the set of subscriptions to which a client subscribes. The client may include one or more nodes ($V_1$) in a subscription set, where a node aggregates one or more data units ($D_1$). The client synchronization request would also include a last version (LV) number indicating the root version number at the time of its last synchronization. Each client may have a different subscription set, or the same subscription set. With respect to FIG. 5, control begins at block 150 when the synchronization manager 14 receives a client synchronization request, including the client subscription set (S) and last version (LV) of the root node. The synchronization manager 14 calls (at block 152) the ComputeOutadatedDataUnits function with the received client subscription set (S), last version number (LV), and the root of the version tree (U), e.g., $V_{13}$. The output (M) of the called ComputeOutadatedDataUnits function is the minimum set of data units in the subscription set (S) that have changed. If (at block 154) the received output (M) is an empty set, then synchronization ends with nothing to return to the client 2a, 2b . . . 2n. Otherwise, if the received output (M) is non-empty, then the synchronization manager 14 retrieves (at block 156) the changed data units specified in the received output (M) from the master database 8 and sends (at block 158) the retrieved modified subscribed data units to the client 2a, 2b . . . 2n to apply to the local database 10a, 10b . . . 10n, respectively, and the current version number at the root node of the version tree 16 to submit as the Last Version (LV) in a subsequent synchronization.

FIG. 6 illustrates logic executed by the synchronization manager 14 to implement the ComputeOutdatedDataUnits function, which is called at block 152 in FIG. 5. In response to the call (at block 200), which includes a subscription set S, a last version (LV), and a current root node (u), the synchronization manager 14 initializes (at block 202) M to an empty set. The received current root node (u) may be the root node of the version tree 16, e.g., $V_{13}$, or any other node in the tree for any recursive calls to the ComputeOutdatedDataUnits function. If (at block 204) the received subscription set S is empty, then M is returned (at block 206) empty because the subscription set is empty, i.e., there are no subscribed data units that could have been changed because there are not subscribed data units. Otherwise, if the received subscription set S is non-empty and if (at block 208) the received last version (LV) is not less than the version number of the received current root node (u), then the M is returned (at block 210) empty because all the subscriptions are up-to-date because the last version (LV) the client has is not below the version of the received root node (u) being checked.

If (at block 208) the client's last version (LV) is less than the version number of the current root node (u) and if (at block 212) the current root node (u) is a leaf node, e.g., the nodes directly representing the data units, e.g., $V_1, V_2 \ldots V_7$ in FIG. 2), then the data unit corresponding to the current root node (u) is added to the return set M and M is then returned (at block 214) because there are no further child nodes that aggregate descendant data unit nodes that may have subscribed modified data. If (at block 212) the received root node (u) is not a leaf node, i.e., does not represent a data unit and has nodes representing data units as descendants, then a loop is performed at blocks 216 through 228 for each child $u_i$ of the current root node (u). If (at block 218) the current node (u) is in the received subscription set S, then the synchronization manager 14 generates (at block 220) a new subscription set $S_1$ and sets the new subscription set $S_1$ to include the child node $u_1$ being considered because the child node either represents data that is aggregated by a subscribed node or is a further ancestor to nodes representing data units in the subscription. Otherwise, if (at block 218) the current node (u) is not in the received subscription set S, then the synchronization manager 14 generates (at block 222) a new subscription set $S_1$ to include all the subscriptions in S which are either descendants of $u_1$ or $u_1$ itself. This step at block 222 causes consideration of only those further nodes that could be in the client requested subscription set and avoids any further consideration of any descendant nodes that would not be within the initial client subscription set or an ancestor of a node within the initial client subscription set. The ComputeOutdatedDataUnits function is then called (at block 224) with the new subscription set $S_1$, the last version (LV), which remains the same throughout the recursive calls, and the child node $u_1$ as the new current root node (u) to obtain output ($M_i$), which are the set of all outdated data units contained within the subscription set $S_1$, i.e., those data units corresponding to V-nodes that are in the subscription set $S_1$ or that are descendant nodes of nodes within the subscription set $S_1$. The received output from the recursive call is added (at block 226) to the set M and M is returned at block 214.

The ComputeOutdatedDataUnit function is recursively called on the children of a node that is in the subscription set or a child node whose descendants are in the subscription set until a leaf node is reached representing a data unit that is specified in the subscription set or is a descendant of a subscribed node. For instance, if the initial subscription set included $V_2$, $V_5$, and $V_{12}$ as shown in FIG. 2 and the last version (LV) is five, then the initial call on the root node of $V_{13}$ would examine the children of $V_{13}$, including $V_{11}$ and $V_{12}$. With respect to $V_{11}$, which functions as $u_1$ in the loop, because the root node $V_{13}$, which is u in the call, is not in S (as determined at block 218), the synchronization manager 14 would generate set $S_1$ for $V_{11}$ to include $V_2$ and $V_5$ because these nodes are descendants of $V_{11}$ ($U_1$) that are in the subscribed set S, that includes $V_2$ and $V_5$. The ComputeOutdatedDataUnit function would then be recursively called on the set $S_1$ including $V_2$ and $V_5$, the LV of five, and the current root node of $V_{11}$ (u). However, because the LV of five is not less then the version number of node $V_{11}$ (u), an empty set M is returned (at block 210 in FIG. 6) because all the subscriptions $V_2$ and $V_5$ in the subscription set $S_1$ recursively called are up to date.

The loop at blocks 216 and 218 would generate a set $S_2$ for $V_{12}(u_2)$, which would include $V_{12}$ because $V_{12}$ is itself in the subscription of S. The ComputeOutdatedDataUnit function would then be recursively called on the set $S_2$ including $V_{12}$, the LV of five, and the current root node of $V_{12}$ (u). Because the LV is less than the version number of the current root node $V_{12}$ (u) (at block 212), control proceeds to make further recursive calls on the children of $V_{12}$ (u), $V_6$ and $V_{10}$. The recursive call on $V_6$ would yield an empty set M because the version number of $V_6$ is less than the LV. However, the recursive calls starting from $V_{12}$ are made until the recursively called root node is a leaf node (at block 212 in FIG. 6), which would eventually produce a result of $V_7$, which corresponds to data unit $D_7$ as the changed subscribed data unit.

With the described implementations, the synchronization manager can determine which subscribed intermediate nodes and aggregated data units have changed without having to scan the actual master database 8. Instead, a tree may be traversed, which can be performed substantially faster than scanning the master database 8 for changed data corresponding to the client subscription sets. Further, in certain implementations, only subscribed data that has changed since the last synchronization is transmitted.

In certain implementations, the synchronization manager 14 may concurrently scan the version tree 16 for multiple client synchronization requests. However, the synchronization manager may not update the version tree 16 after data modification until an exclusive lock is maintained so that the version tree 16 cannot be concurrently scanned to determine modified subscribed data while the version numbers are being updated. Further, while the synchronization manager 14 is processing the version tree 16 according to the logic of FIG. 3 in response to a data unit ($D_1$) update, the version tree 16 cannot be scanned to determine which data was modified since the last synchronization. In certain implementations of versioning, the synchronization manager 14 may gather multiple data unit changes in a batch and use one new version number for all the changes.

Additional Implementation Details

The described techniques for determining changed data may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, certain variables, such as n, j, and i, are used to denote integer values indicating a certain number of elements. These variables may denote any number when used at different instances with the same or different elements.

In the described implementations, after determining that the last version number when the client last synchronized is less than the version number at a node, the synchronization manager traverses downward through the tree until the node corresponding to the subscribed node being checked is reached, so that only data that has been modified is returned. In alternative implementations, upon determining that an ancestor node of a subscribed node has a version number higher than the last version number of the client, indicating that the descendant subscribed node may have a data unit that has changed, the subscribed data may be returned to avoid further traversal of the tree However, with such alternative implementations, data for the subscribed node may still be returned even if the data at the subscribed node has not changed.

In described implementations, the version tree is used to determine data units that have changed since a last synchronization to determine which data to return to a synchronization request. In further implementations, the tree data structure determining changes in data described herein may be used to determine data changes for any purpose, not just for synchronization. For instance, the described logic may be used to determine changed data to back-up as part of an incremental backup operation.

In the described implementations, the version tree is maintained at the server and the server determines whether any client subscribed nodes have been modified. Alternatively, the clients may maintain a copy of the version tree to check for modifications to the client subscribed nodes locally, where the client copy of the version tree would be periodically updated from the server.

In described implementations, the data units and the nodes that aggregated one or more data units and other nodes were implemented in a tree data structure. In alternative implementations, the information and version numbers for the nodes and data units shown in the described tree data structures may be implemented in any data structure known in the art, and is not limited to tree data structures.

The illustrated logic of FIGS. 3 and 5 show certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 7:
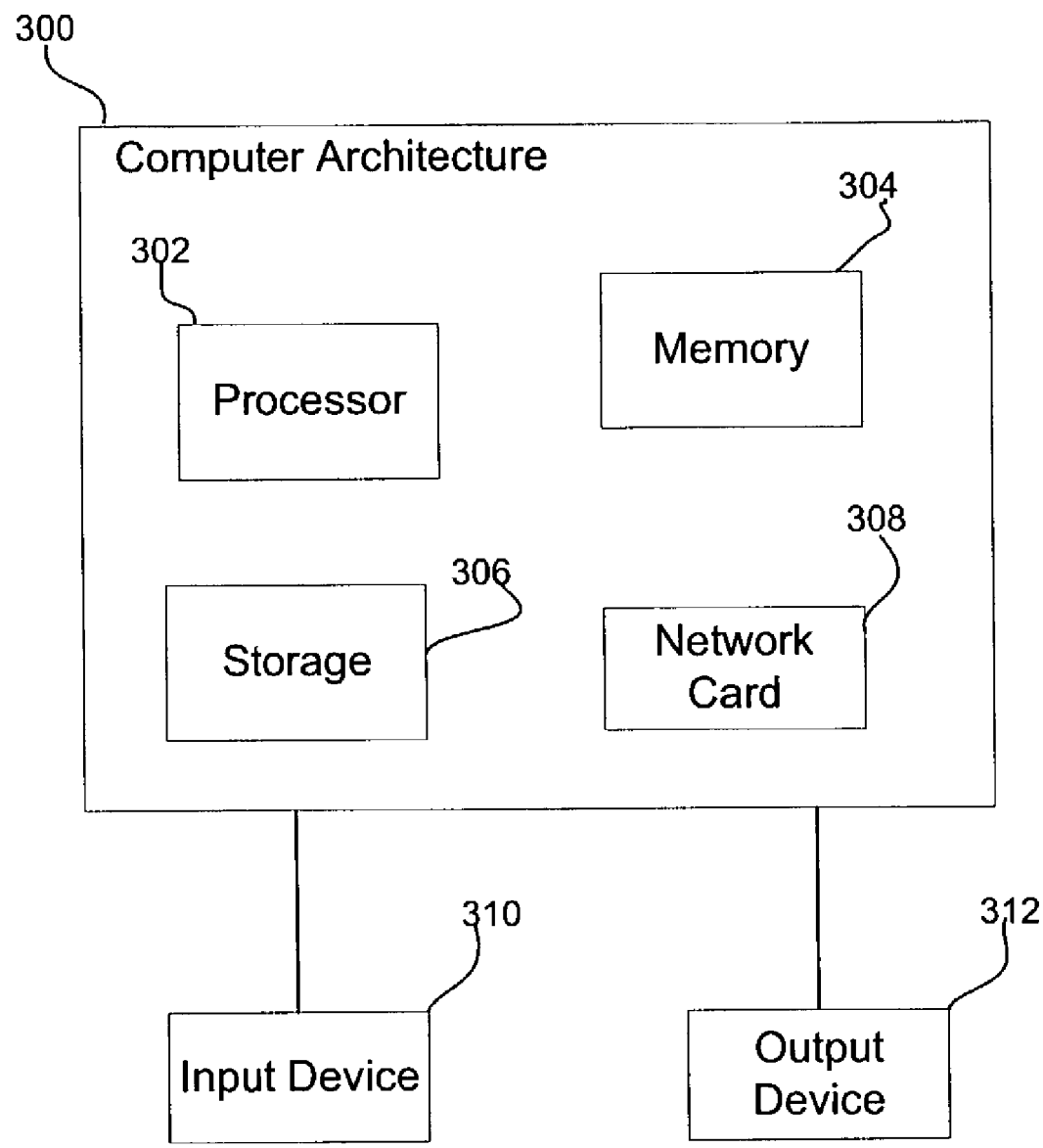
FIG. 7 illustrates an architecture of computing components in the network environment, such as the server and clients, any other computing devices.

FIG. 7 illustrates one implementation of a computer architecture 300 of the network components, such as the clients 2a, 2b . . . 2n and server 4 shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for determining whether data has been modified, comprising:

receiving one node associated with at least one data unit and a last version number;

processing a data structure having a plurality of nodes, wherein there is one node associated with each data unit and at least one node that is capable of aggregating one or more nodes, wherein version numbers are associated with the nodes, wherein the data structure indicates a relationship of nodes, wherein one node is directly associated with each data unit, and wherein further aggregate nodes aggregate any one or more nodes in the data structure;

determining from the data structure one node that is associated with the data units associated with the received node;

determining that the at least one data unit associated with the received node has been modified if the received last version number is less than a version number of the determined node;

determining an update to one data unit;

setting the version number of the node directly associated with the data unit to an incremented highest version number for a node in the data structure; and for each aggregate node that aggregates the node directly associated with the data unit, setting the version number of the aggregate node to the incremented highest version number if the aggregate node does not aggregate one other node having a version number greater than the incremented highest version number.

2. The method of claim 1, further comprising:
   determining whether the received last version number is less than a first node version number in the data structure before determining one node that is associated with the data units associated with the received node; and
   determining that the received node has not been modified if the received last version number is not less than the first node version number, wherein the operations of determining the one node that is associated with the data units associated with the received node is performed if the received last version number is less than the version number of the first node.

3. The method of claim 1, wherein determining one node that is associated with the data units associated with the received node comprises determining the node in the processed data structure that matches the received node.

4. The method of claim 1, wherein receiving one node comprises receiving a plurality of nodes, wherein the steps of determining one node that is associated with the data units associated with the received node and determining whether the at least one data unit associated with the received node has been modified is performed for each received node.

5. The method of claim 1, wherein the node and last version number are received with a synchronization request, further comprising:
   returning data units associated with the received node to the synchronization request if the at least one data unit associated with the received node is determined to have been modified.

6. The method of claim 5, wherein the synchronization request is received from a client system maintaining a local client database that is a subset of a master database maintained by a server system, wherein the data units comprise tables in the local database, wherein the server system performs the steps to determine whether the at least one data unit associated with the received node has been modified, and wherein the server system returns the data units associated with the received node from the master database to the client system.

7. The method of claim 1, wherein determining one node that is associated with the received node comprises determining one node in which the received node is aggregated if there is a node in which the received node is aggregated or determining the node in the data structure that matches the received node, further comprising:
   if the received last version number is less than the version number of the determined node and the received node is aggregated in the determined node, then farther performing:
     (i) determining a further node in which the received node is aggregated if there is one node not yet considered in which the received node is aggregated or a determination of the node in the data structure that matches the received node; and
     (ii) determining whether the received last version number is less than the version number of the further determined node.

8. The method of claim 7, further comprising:
   returning indication that the received node has not been modified if the received last version number is not less than the version number of one determined node.

9. The method of claim 1, wherein the nodes are arranged in the data structure in a tree data structure, wherein each aggregate node is the parent to at least one other aggregate node or one node that is directly associated with one data unit.

10. The method of claim 9, further comprising:
    determining whether the received last version number is less than a root node version number in the tree data structure before determining one node that is associated with the data units associated with the received node; and
    determining that the received node has not been modified if the received last version number is not less than the root node version number.

11. The method of claim 10, wherein determining one node that is associated with the received node comprises determining one child node to the root node of which the received node is a descendant or which is the received node, and further comprising:
    if the received last version number is not less than the version number of the determined child node, then determining that the received node has not been modified.

12. The method of claim 11, further comprising:
    if the received last version number is less than the version number of the determined child node and the received node is a descendant of the determined child node, then determining a further child of the previously determined child node of which the received node is the descendent to determine whether the received last version number is less than the version number of the determined further child node, wherein further child nodes having the received node as a descendant are considered until either the determined child node is the received node or the received version number is not less than the version number of the determined further child node.

13. The method of claim 11, further comprising
    if the received last version number is less than the version number of the determined child node and the child node is the received node, then determining that the received node has been modified.

14. A system for determining whether data has been modified, comprising:
    a computer readable medium including a data structure having a plurality of nodes, wherein there is one node associated with each data unit and at least one node that is capable of aggregating one or more nodes, wherein version numbers are associated with the nodes, wherein the data structure indicates a relationship of nodes, wherein one node is directly associated with each data unit, and wherein further aggregate nodes aggregate any one or more nodes in the data structure;
    means for determining an update to one data unit;
    means for setting the version number of the node directly associated with the data unit to an incremented highest version number for a node in the data structure;
    means for setting, for each aggregate node that aggregates the node directly associated with the data unit, the version number of the aggregate node to the incremented highest version number if the aggregate node does not aggregate one other node having a version number greater than the incremented highest version number;
    means for receiving one node associated with at least one data unit and a last version number;
    means for determining from the data structure one node that is associated with the data units associated with the received node; and
    means for determining that the at least one data unit associated with the received node has been modified if the received last version number is less than a version number of the determined node.

15. The system of claim 14, further comprising:
means for determining whether the received last version number is less than a first node version number in the data structure before determining one node that is associated with the data units associated with the received node; and
means for determining that the received node has not been modified if the received last version number is not less than the first node version number, wherein the operations of determining the one node that is associated with the data units associated with the received node is performed if the received last version number is less than the version number of the first node.

16. The system of claim 14, wherein the node and last version number are received with a synchronization request, further comprising:
returning data units associated with the received node to the synchronization request if the at least one data unit associated with the received node is determined to have been modified.

17. The system of claim 14, wherein the means for determining one node that is associated wit the received node determines one node in which the received node is aggregated if there is a node in which the received node is aggregated or determining the nod in the data structure that matches the received node, further comprising:
means for performing, if the received last version number is less than the version number of the determined node and the received node is aggregated in the determined node:
(i) determining a further node in which the received node is aggregated if there is one node not yet considered in which the received node is aggregated or a determination of the node in the data structure that matches the received node; and
(ii) determining whether the received last version number is less than the version number of the further determined node.

18. The system of claim 14, wherein the nodes are arranged in the data structure in a tree data structure, wherein each aggregate node is the parent to at least one other aggregate node or one node that is directly associated with one data unit.

19. The system of claim 18, further comprising:
means for determining whether the received last version number is less than a root node version number in the tree data structure before determining one node that is associated with the data units associated with the received node; and
means for determining that the received node has not been modified if the received last version number is not less than the root node version number.

20. An article of manufacture computer implemented method for determining whether data bas been modified, wherein the article of manufacture causes operations to be performed, the operations comprising:
receiving one node associated with at least one data unit and a last version number;
processing a data structure having a plurality of nodes, wherein there is one node associated with each data unit and at least one node that is capable of aggregating one or more nodes, wherein version numbers are associated with the nodes, wherein the data structure indicates a relationship of nodes, wherein one node is directly associated with each data unit, and wherein further aggregate nodes aggregate any one or more nodes in the data structure; and
determining from the data structure one node that is associated with the data units associated with the received node;
determining that the at least one data unit associated with the received node has been modified if the received last version number is less than a version number of the determined node;
determining an update to one data unit;
setting the version number of the node directly associated with the data unit to an incremented highest version number for a node in the data structure;
for each aggregate node that aggregates the node directly associated with the data unit, setting the version number of the aggregate node to the incremented highest version number if the aggregate node does not aggregate one other node having a version number greater than the incremented highest version number.

21. The article of manufacture of claim 20, further comprising:
determining whether the received last version number is less than a first node version number in the data structure before determining one node that is associated with the data units associated with the received node; and
determining that the received node has not been modified if the received last version number is not less than the first node version number, wherein the operations of determining the one node that is associated with the data units associated with the received node is performed if the received last version number is less than the version number of the first node.

22. The article of manufacture of claim 20, wherein determining one node that is associated with the data units associated with the received node comprises determining the node in the processed data structure that matches the received node.

23. The article of manufacture of claim 20, wherein the node and last version number are received with a synchronization request, further comprising:
returning data units associated with the received node to the synchronization request if the at least one data unit associated with the received node is determined to have been modified.

24. The article of manufacture of claim 20, wherein determining one node that is associated with the received node comprises determining one node in which the received node is aggregated if there is a node in which the received node is aggregated or determining the node in the data structure that matches the received node, further comprising:
if the received last version number is less than the version number of the determined node and the received node is aggregated in the determined node, then further performing:
(i) determining a further node in which the received node is aggregated if there is one node not yet considered in which the received node is aggregated or a determination of the node in the data structure that matches the received node; and
(ii) determining whether the received last version number is less than the version number of the further determined node.

25. The article of manufacture of claim 20, wherein the nodes are arranged in the data structure in a tree data structure, wherein each aggregate node is the parent to at least one other aggregate node or one node that is directly associated with one data unit.

26. The article of manufacture of claim 25, further comprising:

determining whether the received last version number is less than a root node version number in the tree data structure before determining one node that is associated with the data units associated with the received node; and determining that the received node has not been modified if the received last version number is not less than the root node version number.

27. The article of manufacture of claim 26, wherein determining one node that is associated with the received node comprises determining one child node to the root node of which the received node is a descendant or which is the received node, and further comprising:

if the received last version number is not less than the version number of the determined child node, then determining that the received node has not been modified.

28. The article of manufacture of claim 27, further comprising:

if the received last version number is less than the version number of the determined child node and the received node is a descendant of the determined child node, then determining a further child of the previously determined child node of which the received node is the descendent to determine whether the received last version number is less than the version number of the determined further child node, wherein further child nodes having the received node as a descendant are considered until either the determined child node is the received node or the received version number is not less than the version number of the determined further child node.

* * * * *